(12) United States Patent
McDowell (10) Patent No.: US 7,051,651 B2
(45) Date of Patent: May 30, 2006

(54) BALING APPARATUS

(76) Inventor: Bruce Richard McDowell, 62, Parsons Road, Waireka, Oamaru (NZ)

( * ) Notice: Subject to any disclaimer, the term of this patent is extended or adjusted under 35 U.S.C. 154(b) by 18 days.

(21) Appl. No.: 10/499,918

(22) PCT Filed: Dec. 20, 2002

(86) PCT No.: PCT/NZ02/00286

§ 371 (c)(1),
(2), (4) Date: Jun. 21, 2004

(87) PCT Pub. No.: WO03/053131

PCT Pub. Date: Jul. 3, 2003

(65) Prior Publication Data

US 2005/0016394 A1    Jan. 27, 2005

(30) Foreign Application Priority Data

Dec. 21, 2001   (NZ) ...................................... 516353

(51) Int. Cl.
*B30B 7/00* (2006.01)
(52) U.S. Cl. ...................... 100/264; 100/100; 100/179; 100/215; 100/244; 100/245

(58) Field of Classification Search ................ 100/100, 100/178, 179, 214, 215, 240, 241, 242, 244, 100/245, 264, 267, 268, 906; 425/450.1, 425/451.9
See application file for complete search history.

(56) References Cited

U.S. PATENT DOCUMENTS

| 2,596,872 | A | * | 5/1952 | Skromme | ................... 100/191 |
| 3,195,448 | A | * | 7/1965 | Larsen et al. | ................ 100/245 |
| 3,348,653 | A | * | 10/1967 | Mills | ........................... 100/102 |
| 3,772,983 | A | * | 11/1973 | Nichols | ....................... 100/353 |

FOREIGN PATENT DOCUMENTS

GB        2055072 A  *  2/1981

* cited by examiner

*Primary Examiner*—Derris H. Banks
*Assistant Examiner*—Jimmy T. Nguyen
(74) *Attorney, Agent, or Firm*—McCormick, Paulding & Huber LLP (57) ABSTRACT

Baling apparatus (2) for preparing highly compressed bales of materials such as silage, wool, paper, cardboard, plastics materials and scrap metal, the baling apparatus including a compression chamber (5) which includes two opposed gates (6, 7) which can be moved towards or away from each other by moving means (15, 16, 17, 18), to compress material between the gates into a bale; the gates being moved by moving means (15, 16, 18) which are mounted alongside the compression chamber (5).

12 Claims, 9 Drawing Sheets

BALING APPARATUS

TECHNICAL FIELD

The present invention relates to apparatus for forming bales of a range of different materials, and in particular to baling apparatus capable of making highly compressed bales.

The apparatus of the present invention is especially well suited to making highly compressed bales of fragmented materials such as silage, hay, straw, wool, rags, paper, cardboard, plastics materials including plastics containers, fibrous waste materials, and scrap metal.

The density of a highly compressed bale varies, depending upon the material in the bale; for a bale of silage (50 percent to 60 percent dry matter) a bulk density of 900 kilograms per cubic metre is typical; for baled scrap cardboard a typical density would be 500 kilograms per cubic metre.

BACKGROUND ART

Highly compressed bales have a number of advantages:—they provide compact storage and thus save space; they have better cohesion and are less prone to damage in handling. In the case of bales of silage and similar fodder, because the dense bale structure is less permeable to air than a conventional bale structure, the contents of the bale are less prone to oxidisation and to drying out than in a conventional bale.

In the case of baled silage, the reduced air permeability provided by a highly compressed bale structure is especially valuable because it is important that silage should be stored under anaerobic conditions, because silage is preserved by the action of anaerobic bacteria.

Highly compressed silage bales have the further advantage that, for a given weight of silage, a highly compressed bale gives a much smaller surface area to be sealed. It will be appreciated that silage must be well sealed from the air (ideally, completely sealed from the air) for optimum anaerobic digestion and good storage characteristics. The density of the bale depends upon the compaction pressure and the compaction time. Obviously, it is advantageous in a majority of situations to produce the bales as rapidly as possible, and the time taken to achieve a given bulk density can be reduced by using an increased compaction pressure. However, many materials have some elasticity, and therefore have hysteresis losses when compacted; to reduce such losses, it is necessary to use a lower compaction pressure for a longer time.

It follows that, to optimise the efficiency of the compaction process, it is necessary to be able to adjust compaction pressures and compaction times to obtain rapid compaction but minimize hysteresis losses; these factors will vary according to the materials being compressed.

A further factor which must be taken into account is the size of the compaction equipment:—while size seldom is critical for stationary equipment, it is important that mobile equipment is not too large, since overlong equipment is very difficult to move safely.

DISCLOSURE OF INVENTION

It is therefore an object of the present invention to provide apparatus for forming highly compressed bales which allows the factors of compaction time and compaction pressures to be adjusted for maximum compression in minimum time, but with minimum hysteresis losses.

Another object of the present invention is the provision of apparatus which is capable of compressing a load in two opposite directions simultaneously, and hence increasing both the speed and efficiency of compression, but with the means for providing the compression so arranged that the overall length of the apparatus is kept to a minimum.

A further object of the invention is to provide a relatively inexpensive baling apparatus which also is simple to use.

The present invention provides a baling apparatus comprising a compression chamber two dimensions of which are fixed and the third dimension of which can be varied by the movement of two opposed gates, which can be moved towards or away from each other by the operation of moving means; said moving means being mounted alongside the compression chamber parallel to said third dimension of said compression chamber.

Preferably the two fixed dimensions are the height and width of the compression chamber and the third dimension is the length of the compression chamber, with the opposed gates mounted one at each end of the compression chamber; each gate is movable by means of a pair of moving means.

Preferably also, the compression chamber includes a reinforced portion and the moving means are mounted on the outside of the reinforced portion.

Preferably, each gate lies in a substantially vertical plane.

BRIEF DESCRIPTION OF DRAWINGS

By way of example only, preferred embodiments of the present invention are described in detail with reference to the accompanying drawings, in which:—

BEST MODES FOR CARRYING OUT THE INVENTION

Referring to FIGS. 1–5 of the drawings, a baling apparatus 2 designed particularly for baling silage or similar fodder is constructed as a trailer unit adapted to be towed by means of a drawbar (not shown) mounted at the front 3 of the apparatus. The apparatus 2 is mounted on a pair of wheels 4. The apparatus includes a central bale-forming compression chamber 5 which is fixed in height but which can be altered in length by moving a pair of gates 6,7, towards or away from each other.

Figure 1:
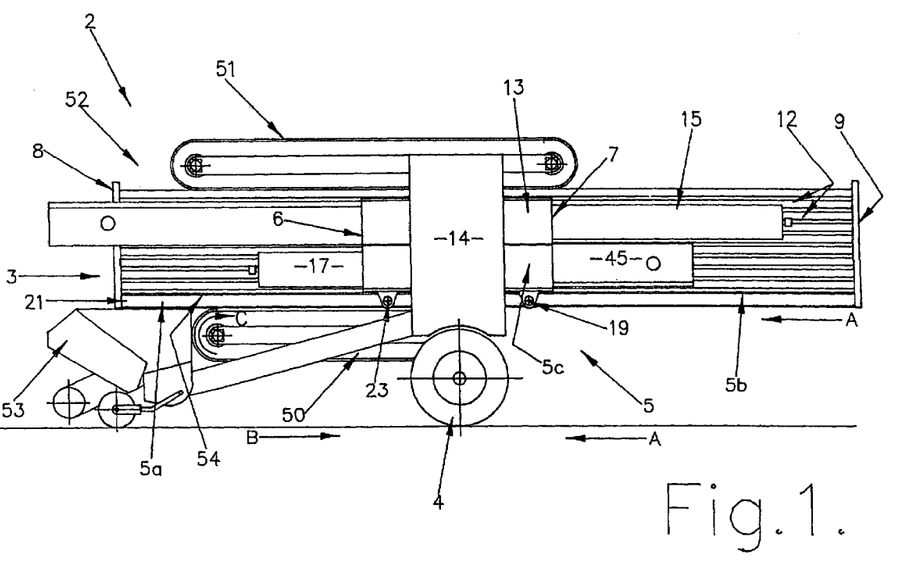
FIG. 1 is a general side view of a first embodiment of the present invention.

The forward gate 6 is movable from a position adjacent the forward end 8 to the fully-compressed position shown in FIG. 1. The rear gate 7 is movable from a position adjacent the rear end 9 to the position of FIG. 1. The gates 6,7, can be moved independently of each other, but usually are moved simultaneously, as hereinafter described.

The chamber 5 is formed in three sections:—outer sections 5a and 5b and an inner section 5c. All sections are of the same height.

The outer sections 5a, 5b are of unequal length: the rear-most section 5b is longer than 5a, to allow space for a formed bale to be removed from the apparatus. The sides 10, 11, of the sections 5a, 5b, are formed by vertically-spaced horizontal slats 12 which also act as guides for the gates 6, 7, as hereinafter described.

The inner section 5c has solid sides 13; the length of this inner section is defined by the inner-most positions of the gates 6, 7, and is the length of the fully-compressed formed bale since the greatest stresses in the apparatus are upon section 5c, each side 13 of section 5c is reinforced by a housing 14 which is secured to the trailer chassis and which provides anchorage points for four moving means in the form of hydraulic cylinders 15, 16, 17, 18 which move gates 6, 7.

Figure 2:
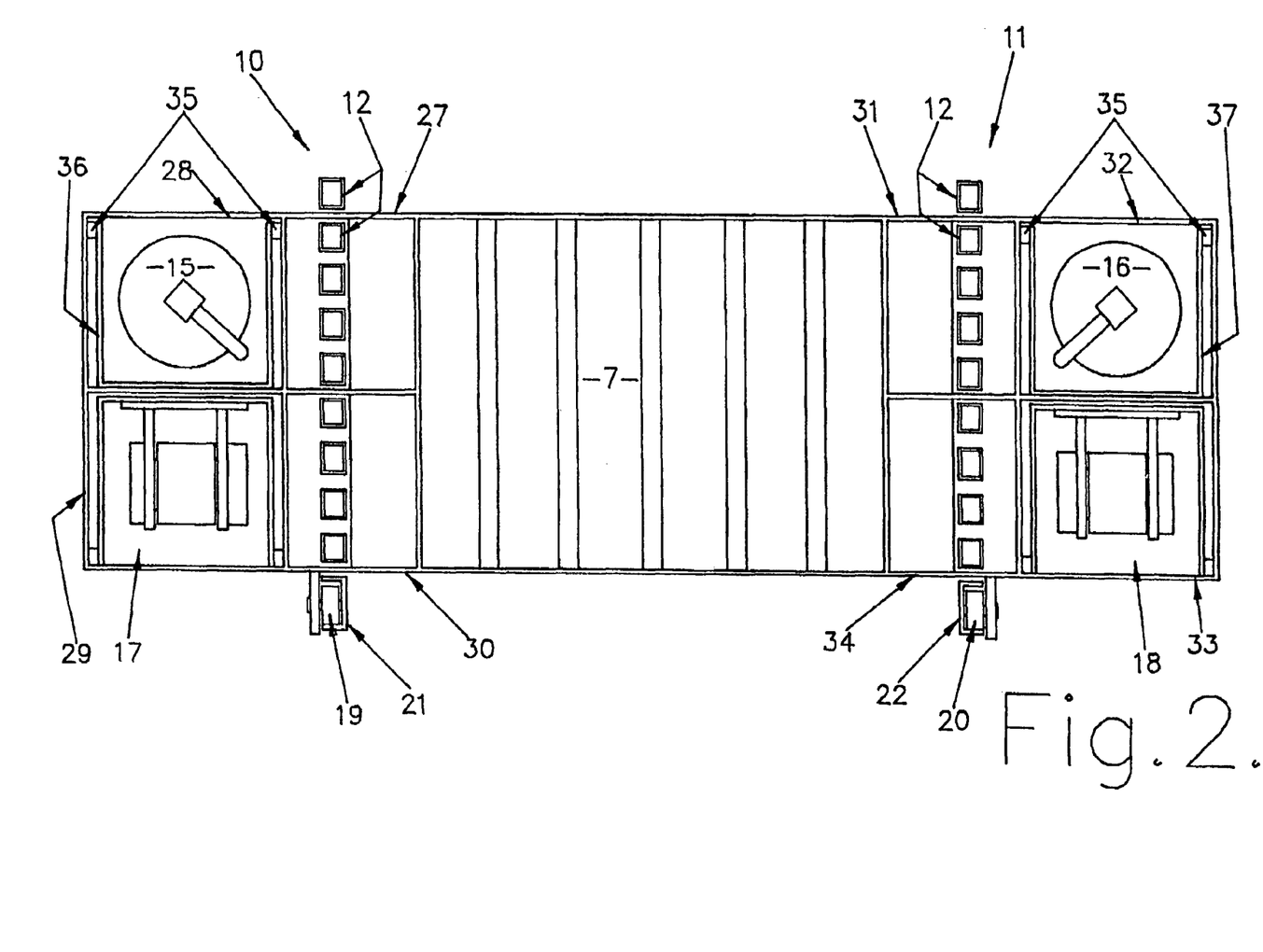
FIG. 2 is an end view (on an enlarged scale) of the apparatus of FIG. 1, taken in the direction of arrow II.

Referring especially to FIG. 2, the rear gate 7 is controlled by the upper pair of hydraulic cylinders, 15 and 16.

The gate 7 is guided along the length of its travel by a spaced pair of wheels 19, 20 mounted on the underside of the gate 7 and each engaged with a guide channel 21, 22 which extend from the rear 9 of the apparatus to the front 8, along each side of the apparatus and also serve as guides for the wheels secured to the underside of the gate 6, only one of which, 23, is visible (FIG. 1).

The gate 7 is formed from a series of vertical slats 25 mounted in a frame, each outer end of which is formed as two pairs of box-section members 27–30 and 31–34 respectively. The innermost members 27, 30, 31, 34 are arranged with their horizontal sides lying between or below the slats 12 forming the sides of compression chamber 5, so that the gate 7 is free to slide in a horizontal plane.

The upper outermost members 28, 32 are welded by welds 35 to the rear ends of connecting members in the form of I-cross-section channels 36, 37 which extend along the interior of the members 28 and 32. Each channel 36, 37, extends to a position just forward of the housing 14.

Figure 3:
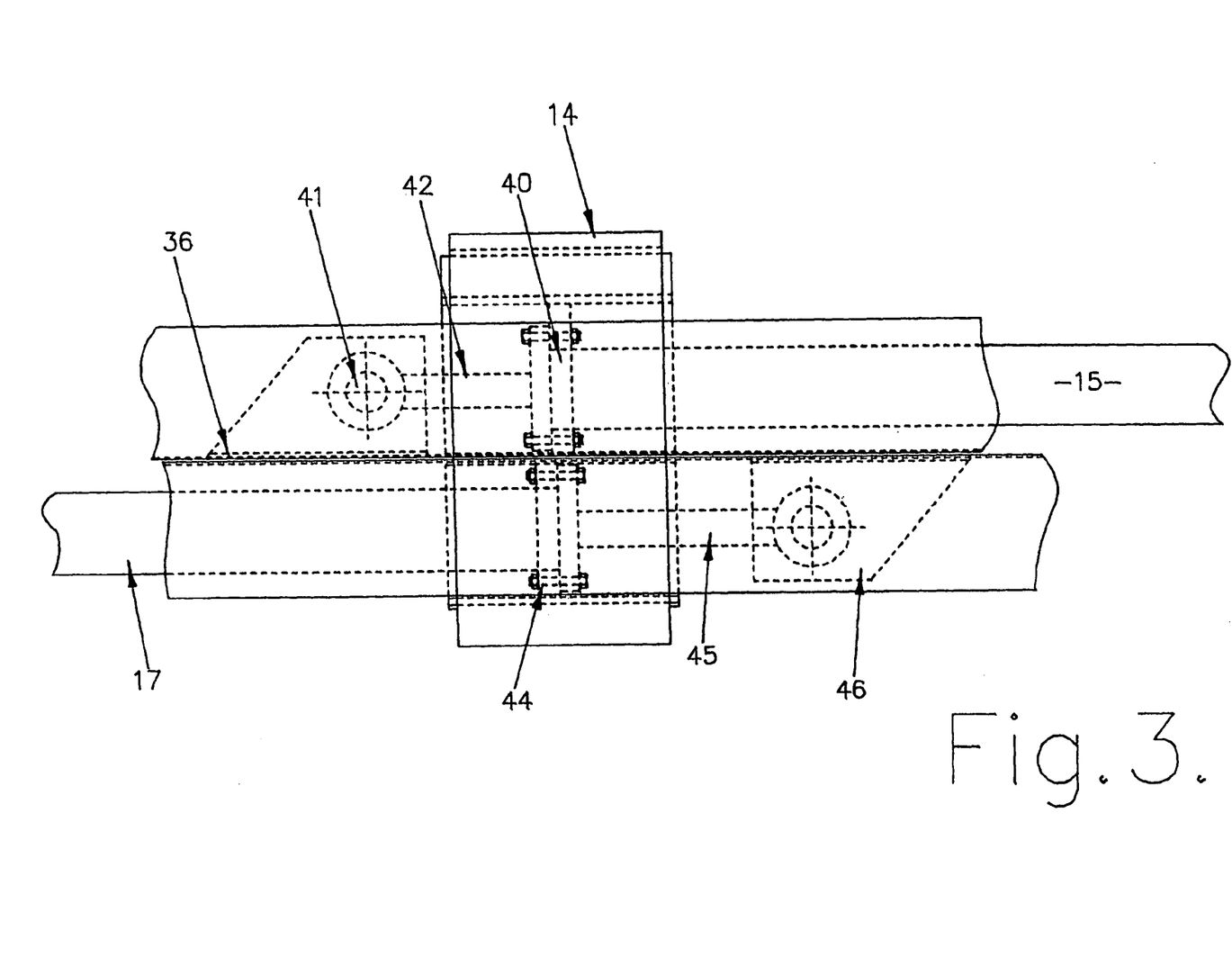
FIG. 3 is a side view of part of FIG. 1.
Figure 4:
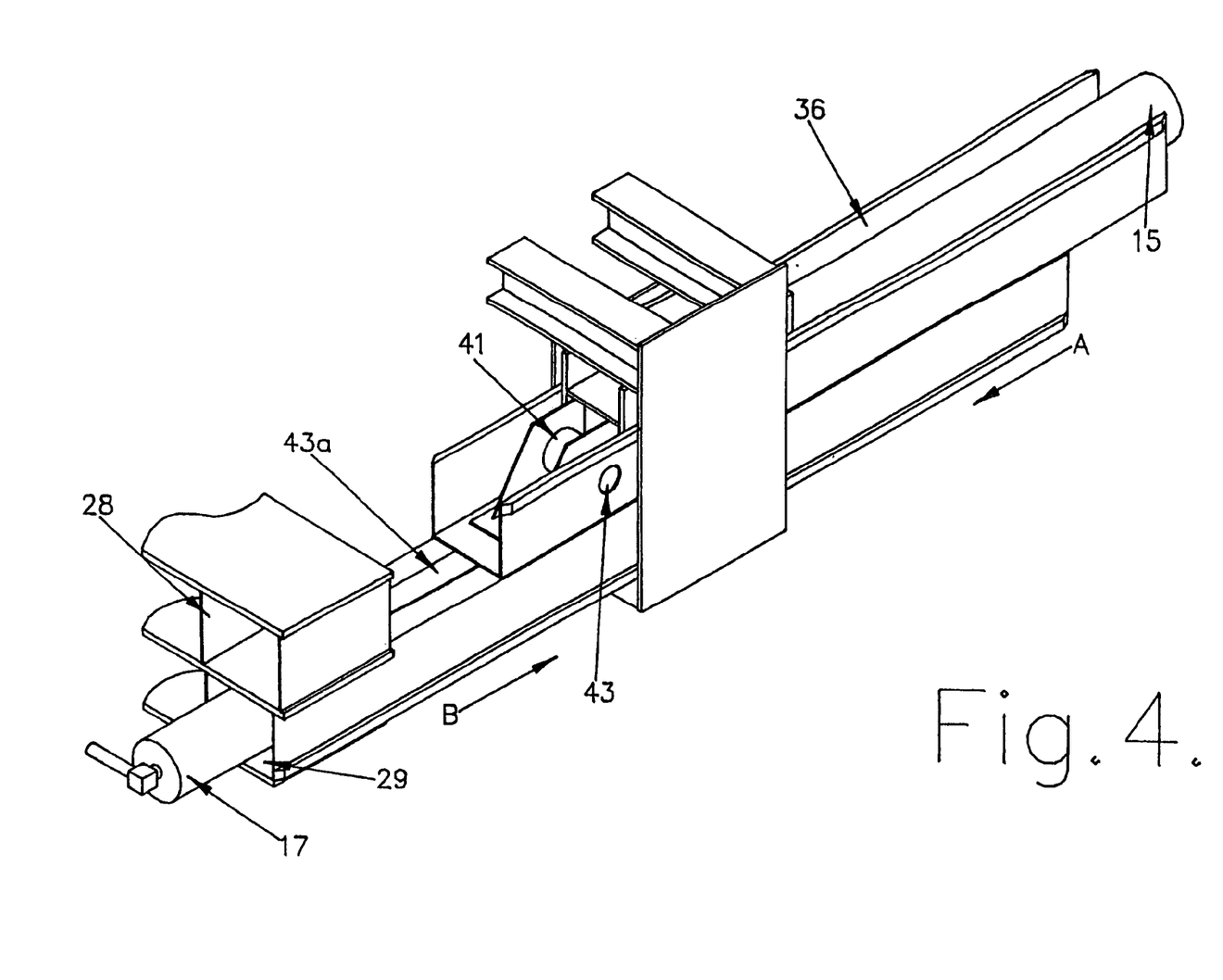
FIG. 4 is an isometric view of part of FIG. 1, partly broken away.

Referring especially to FIGS. 2, 3 and 4, the hydraulic cylinders 15, 16, are mounted within the channels 36,37 with the direction of stroke of each cylinder parallel to the longitudinal axes of the channels 36,37 and the members 28,32.

Each cylinder 15,16, is mounted adjacent its inner end by a mounting bracket 40 secured to the housing 14, as shown in FIG. 3 with reference to cylinder 15 only. The free end 41 of the associated rod 42 is rigidly secured to a strong-point 43 (FIG. 4) adjacent the forward end of the channel 36.

The cylinder 16 on the opposite side of the apparatus is mounted in exactly the same way as the cylinder 15. Thus, to move the gate 7 forwards (i.e. in the direction of arrows A, FIGS. 1 and 4), fluid is supplied to the cylinders 15 and 16, extending the associated cylinder rods and moving the channels 36, 37, and hence the attached members 27–32, and gate 7 all in the direction of arrow A. To reverse the movement of the gate 7, the cylinder rods are moved back into the cylinders 15, 16. A strip 43a of low-friction material such as 'Teflon' (Registered Trade Mark) is mounted beneath each channel 36, 37.

The front gate 6 is controlled by the two lower hydraulic cylinders 17,18, in the same manner as the rear gate 7 is controlled by the cylinders 15 and 16, except that the cylinders 17 and 18 are mounted facing in the opposite direction to cylinders 15 and 16. Thus, extension of the cylinder rods associated with cylinders 17 and 18 moves the channels secured thereto and the members attached to the channels, in the direction of arrows B. FIGS. 3 and 4 show the cylinder 17 mounted in the housing 14 by its mounting bracket 44, with the rod 45 of cylinder 17 secured to channel 46.

Figure 5:
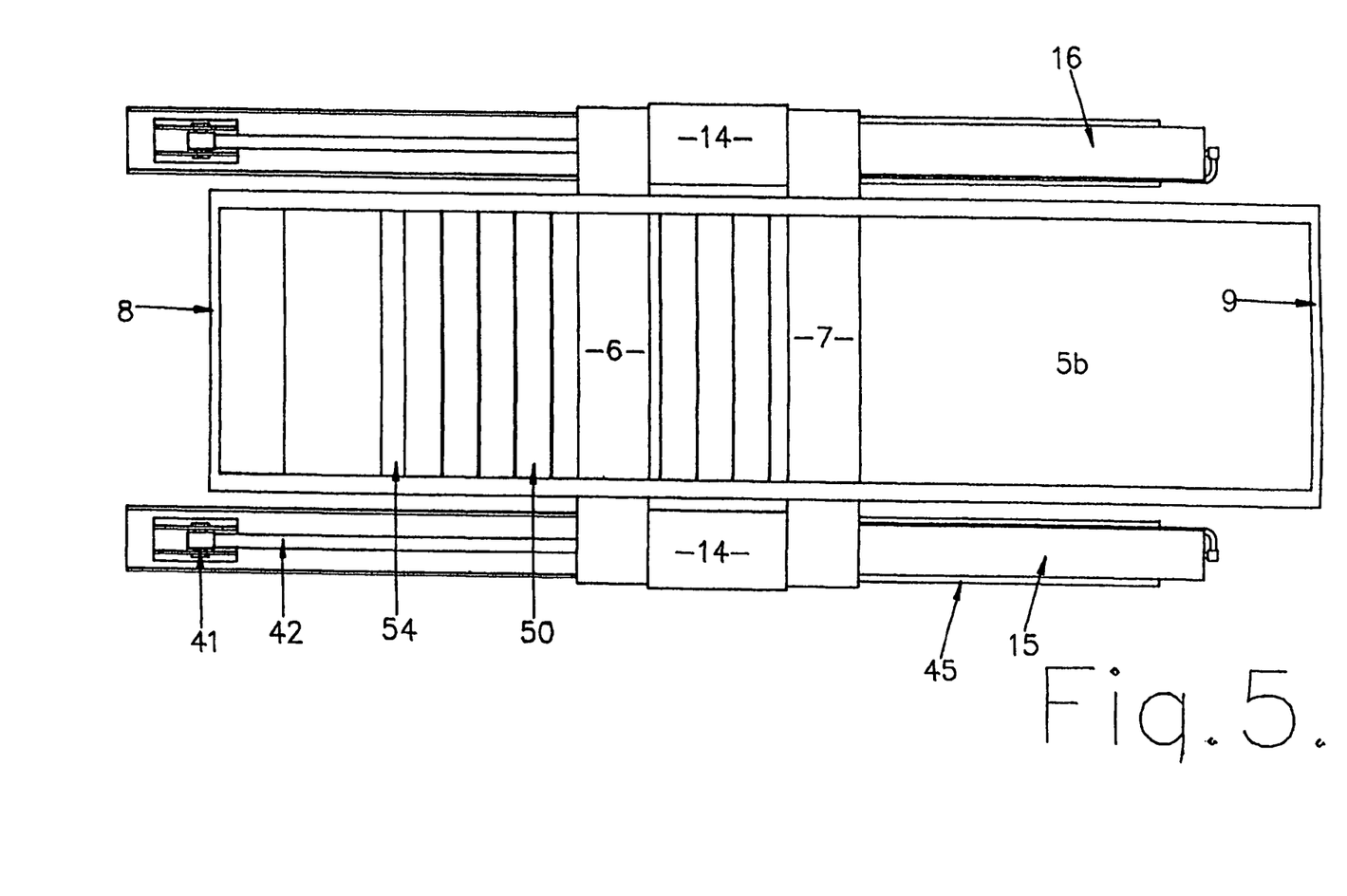
FIG. 5 is a plan view, with the top of the apparatus removed.
Figure 6:
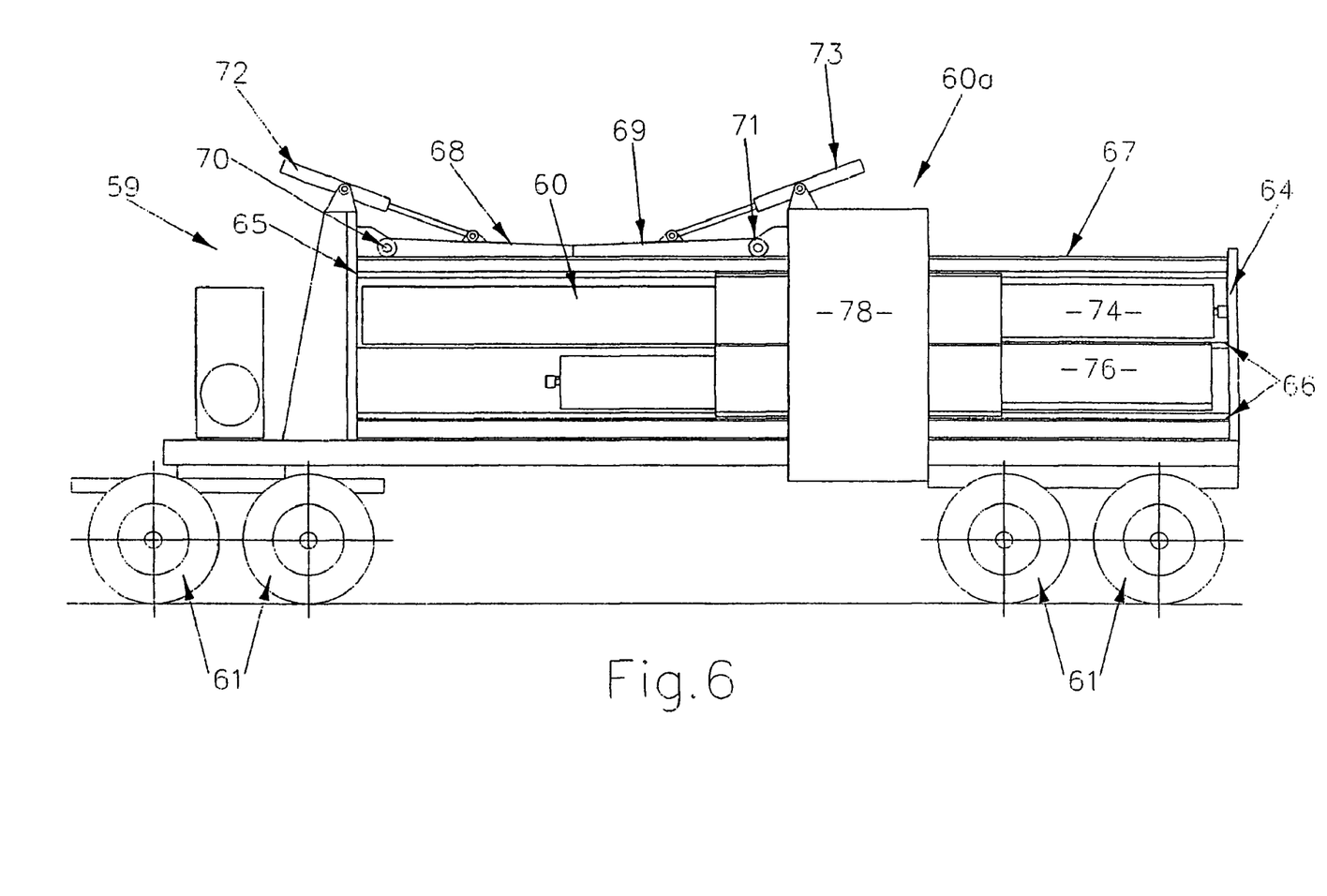
FIG. 6 is a general side view of a second embodiment of the present invention.

Referring now to FIGS. 1 and 5 the floor and the roof of the compression chamber 5 are partly formed by slatted conveyors 50,51, which are supported upon spaced driven rollers in known manner and are arranged to travel in directions C and D respectively, to move material to be compacted (e.g. cut grass for silage) from the outer part of the chamber 5a towards the parts 5c and 5b. The forward end 52 of the roof can be left open, or permanently closed. The forward end of the floor is occupied by a pick-up feeder 53 which may be of any suitable know type (e.g. a 'Strautmann' feeder for a silage wagon) which is capable of picking up cut fodder from the ground and feeding it upwards into chamber 5a, where the conveyors 50 and 51 move it towards the rear of the apparatus.

The roof of the section 5b may be permanently closed or may be closed by removable flaps or hatches (not shown). The floor of section 5b is closed by a removable flap or latch (not shown).

Referring especially to the case of baling silage, the above—described apparatus is used as follows:—first, grass is mowed and windrowed in the usual way. The apparatus 2 is connected to a suitable towing vehicle, and the gates 6,7 are moved (if necessary) respectively to the front and rear of the apparatus, giving a chamber 5 approximately 6 m long. The apparatus 2 is then towed-along the windrows, with the pickup 53 driven, to pick up the cut grass and pass it upwards into the section 5a, to be moved rearwards by the conveyors 50 and 51. The pickup 53 may have a reciprocating mower knife (not shown) mounted along its upper edge 54, to cut any long lengths of grass if necessary. This continues until the chamber 5 is packed with grass. The apparatus is then halted and the pickup 53 and knife are stopped. The rods of the hydraulic cylinders 15, 16, 17, 18 are extended, to move the gates 6, 7, towards their inner (FIG. 1) positions one at each end of the section 5c, which is approximately 1.2 m long and about 0.7 m high. As the gates 6, 7, move towards their inner positions, the conveyors 50,51; are driven since they help to move the grass towards the section 5c. The degree of compression of the grass obviously depends upon how tightly-packed the grass in the whole of the chamber 5 was before the gates 6, 7, were moved inwards. However, the aim is to achieve a very highly compressed bale, with a bulk density of the order of 1000 kg/cubic metre and with a dry matter content of at least 35%.

When the bale is fully compressed, it is tied or banded using any suitable equipment (not shown), and the completed bale is dropped out through a lower trapdoor (not shown), in section 5b. The gates 6 and 7 then are moved back to their starting positions, and the whole procedure is repeated for the next bale.

The completed bales may be stored in any suitable manner.

It will be appreciated that the above-described apparatus may be varied in a number of ways, to suit different applications. For example, the apparatus may be used as a stationary baler, with feed from a top hopper e.g. through the roof. The size and shape of the baler may be varied to suit particular applications. It also would be possible to rotate the apparatus through 90°, i.e. to feed material to be compressed in at one side, with the gates 6 and 7 at the top and bottom of the compression chamber.

The fact that the distribution within the compression chamber of material to be compressed can be accurately controlled by the speed and duration of use of the conveyors 50,51 means that an optimum distribution can be achieved prior to compression, so that the efficiency of the compression also is optimised.

Further, the method of controlling the compression by hydraulically—controlled movement of the gates 6 and 7 permits very accurate control of the rate of movement of the gates, and hence allows the factors of compression time and pressure to be adjusted to achieve maximum compression in minimum time, with minimum hysteresis losses. It will be appreciated that the overall length of the apparatus is kept to a minimum by the fact that the hydraulic cylinders 15/17 and 16/18 are mounted one above the other, along the sides of the apparatus, rather than being mounted at the ends of the apparatus. Thus, the length of the compression chamber 5 is kept as large as possible but the overall length of the apparatus is minimized.

For baling materials such as card, waste plastics, paper or metal, a second-embodiment of the apparatus as shown in FIGS. 6–9 is used. In this apparatus, the pickup 53 and associated apparatus is dispensed with, and material to be bailed is loaded directly into the apparatus (e.g. by front-end loader) through the roof.

Referring to FIGS. 6–9, baling apparatus 59 is depicted as a trailer unit mounted on wheels 61 but may of course be constructed as a stationary unit. The apparatus 59 includes a central bale forming compression chamber 60 which extends for a major portion of the full length of the apparatus and which is fixed in height but can be altered in length by moving an opposed pair of gates 63,64, best seen in FIG. 9, towards or away from each other.

Figure 9:
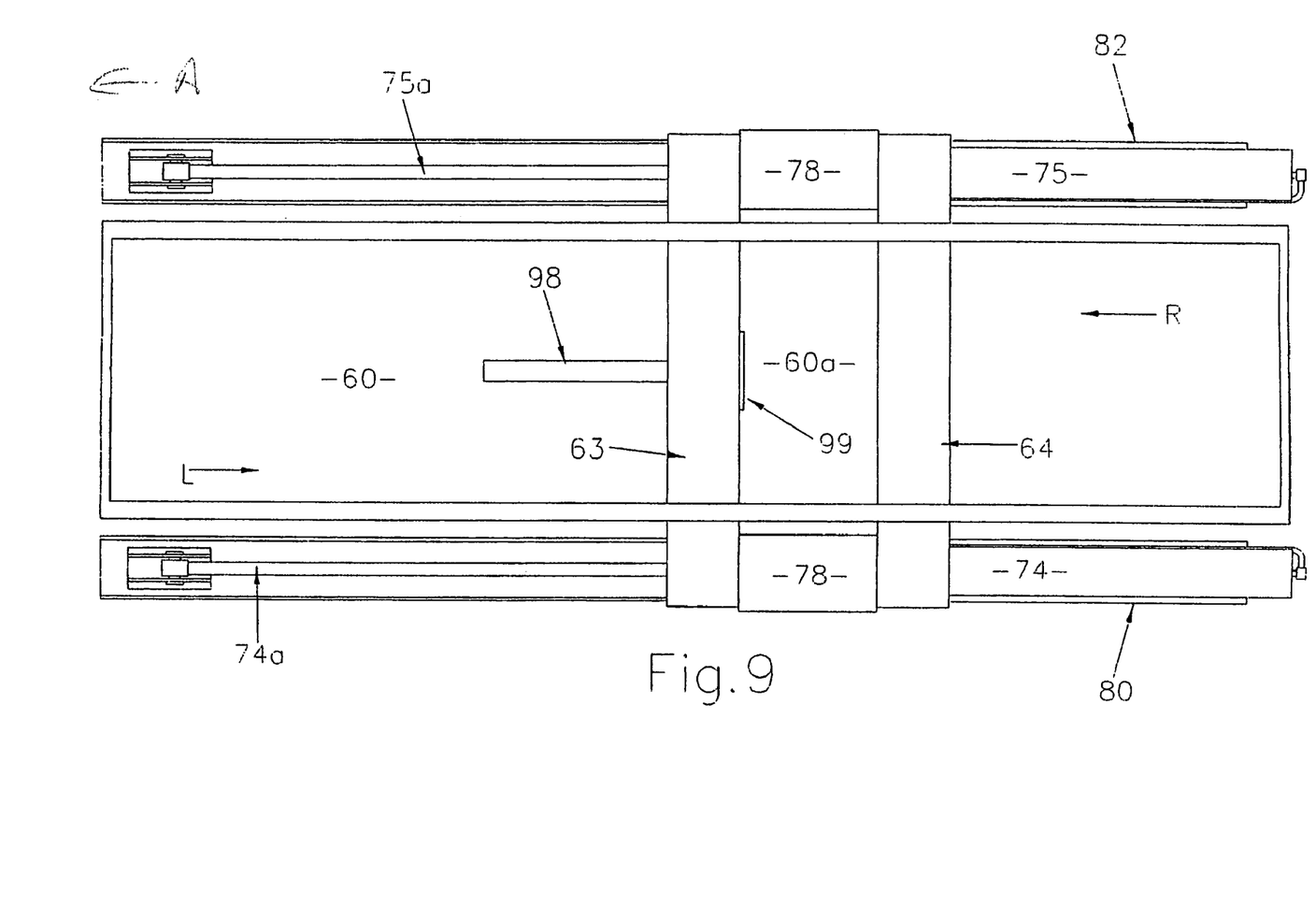
FIG. 9 is a plan view of the apparatus of FIG. 6, with the top of the apparatus removed.

The forward gate 63 can be moved from a position adjacent the front end 65 of the apparatus to the fully compressed position shown in FIG. 9. The rear gate 64 can be moved from a position at the rear end 62 of the apparatus, to the fully compressed position shown in FIG. 9. The gates 63,64 can be moved independently or simultaneously.

Most of the sided of the compression chamber 60 are formed by vertically spaced horizontal slats 66 which also act as guides for the gates 63,64 as hereinafter described. However, over the portion 60a of the compression chamber where the final bale compression takes place, the sides of the chamber are solid, for additional strength.

The rear portion 67 of the top of the apparatus is permanently closed by a solid roof plate. The forward portion of the top of the apparatus can be opened for loading purposes, and is closed by two top doors 68,69, which are pivotally mounted on pivots 70,71 and are opened and closed by hydraulic cylinders 72,73. Each top door 68,69 can be moved by its corresponding control cylinders 72,73 between the fully closed position shown in FIG. 6 and a loading position in which each door 68,69 is pivoted upwards, clear of the opening, allowing free access into the top of the apparatus for loading in materials to be compressed. The materials can be loaded by any suitable means e.g. bucket, conveyor or even manually.

The bottom of the apparatus is permanently closed except for a hatch (not visible) located at the base of the portion 60a, to allow for removal of the formed bale. The hatch is hinged along one longer edge and is opened and held closed by a hydraulic cylinder, (not shown).

Each gate 63,64 is controlled by moving means in the form of a pair of hydraulic cylinders 74,75/76,77 respectively. The cylinders are mounted along the sides of the apparatus, with one cylinder of each pair on one side of the apparatus, and the other cylinder of each pair on the opposite side of the apparatus. The cylinders 74,75 for the rear gate 64 are mounted vertically above the cylinders 76,77 for the front gate 63.

Each of the cylinders 74–77 is anchored to a reinforced bulkhead portion 78 which surrounds and reinforces the bale forming portion 60a, and which is secured to the chassis of the apparatus. The end of each of the cylinders from which the cylinder rod protrudes is rigidly mounted to the bulkhead 78, with the length of each cylinder extending parallel to the length of the apparatus. The cylinder rod of each cylinder is rigidly secured to a connecting member in the form of a channel member 80,81,82, 83 adjacent one end of the member. The base of each channel member extends beneath and parallel to the corresponding cylinder, with the sides of the channel member one on each side of the cylinder. The upper channel members 80,82 extend from the rear to just beyond the bulkhead 78. The lower channel members 81,83 extend from the front to just beyond the bulkhead 78.

The cylinders 74,75 for the rear gate 64 are mounted with the closed ends of the cylinders closest to the rear gate i.e. so that when the cylinder rods 74a,75a, of the cylinders are extended, they travel away from the rear gate. The cylinders 76,77 for the front gate 63 are mounted the opposite way around to the cylinders 74,75, so that when the cylinder rods of the cylinders 76,77 are extended, they travel away from the front gate.

Figure 7:
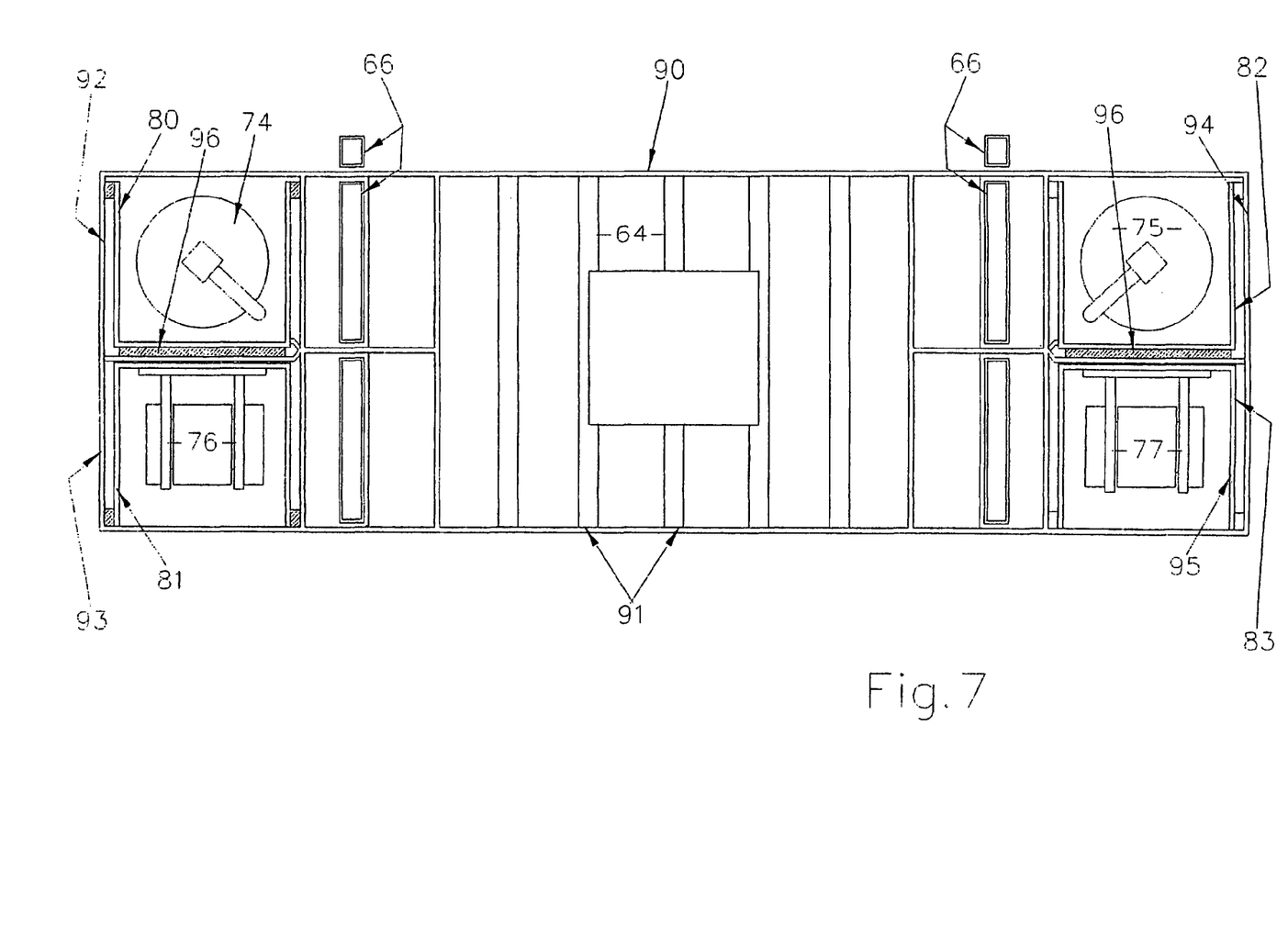
FIG. 7 is an end view of the embodiment of FIG. 6, on a larger scale.
Figure 8:
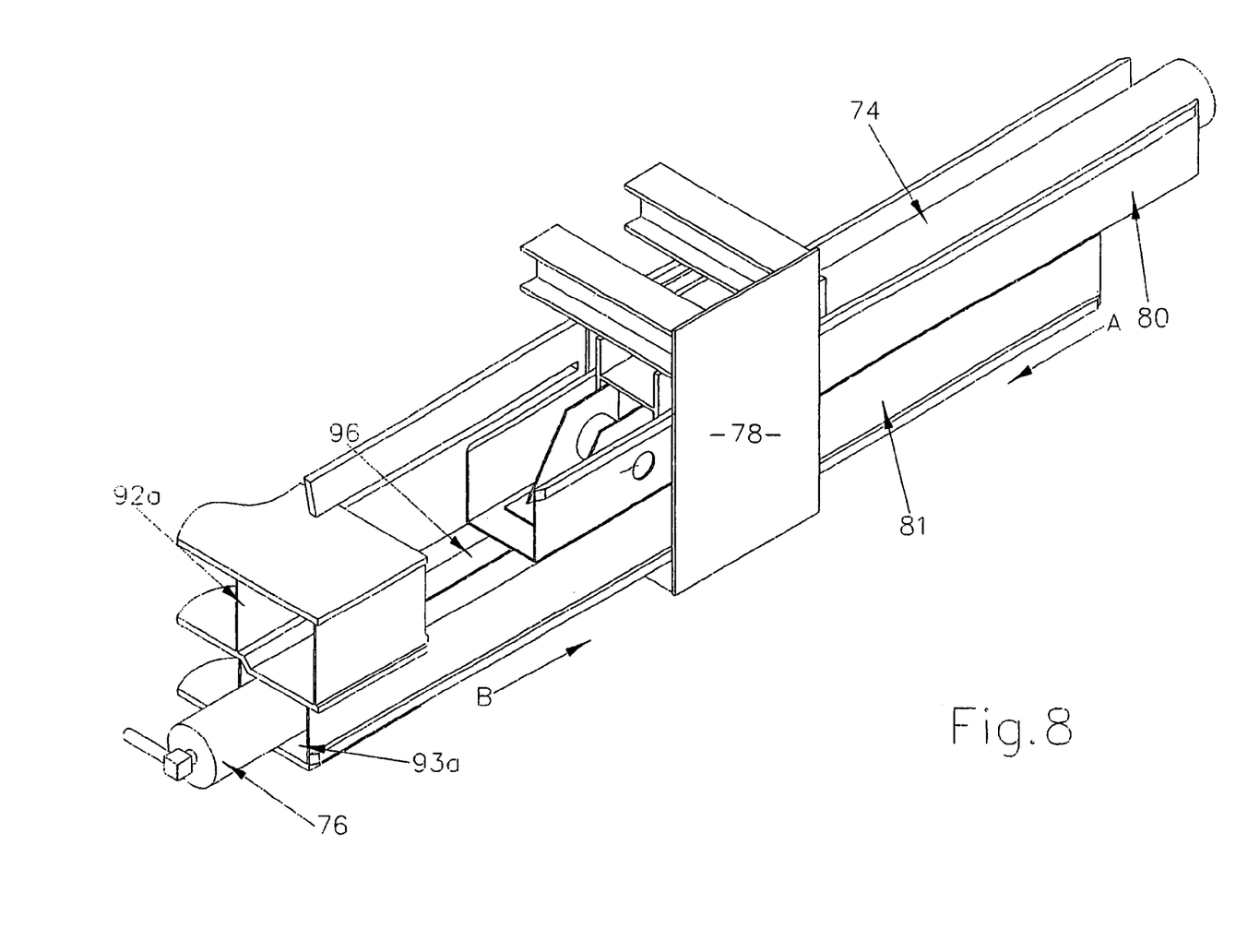
FIG. 8 is an isometric view of part of FIG. 6, partly broken away.

The end side portions of the upper and lower channel members 80,82,/81,83 are rigidly secured (e.g. by welding) to the rear gate 64/front gate 63 respectively. Each gate 63, 64 consists of a rectangular frame 90 supporting a series of vertical struts 91 and two pairs of box section members 92, 93, 94, 95, one pair at each end of the frame. FIG. 7 shows the rear gate 64; the front gate is arranged in the same manner, as partially shown in FIG. 8, which shows the upper and lower box sections 92a,93a which form part of the front gate. As shown in FIG. 7, the horizontal members of the frame 90 pass between the horizontal slats 66 forming the sides of the apparatus, so that the slats act as a guide for the movement of the gate. The box sections 92–95 accommodate the channel members 80–83, which can slide relative to the box sections on pads 96 of low friction plastics material.

The lower surface of each gate 63,64 is provided with a sliding surface of low friction plastics material, (not shown).

To move the rear gate 64, hydraulic fluid is supplied to the cylinders 74,75 to extend the cylinder rods. As the cylinder rods extend, they move in the direction of Arrow A (FIG. 8) and pull the associated channel members 80,82 in the same direction, drawing the rear gate 64 forward in a direction of Arrow A. To move the gate 64 in the opposite direction, the cylinder rods are retracted, moving the channel members 80,82 and the gate 64 back towards the rear of the apparatus.

The forward gate 63 is moved in a similar manner:— when hydraulic fluid is supplied to the cylinders 76,77 and the associated cylinder rods extended, the cylinder rods and the channel members 81,83 are moved in the direction of Arrow B, drawing the forward gate in the same direction. The forward gate is moved in the opposite direction by retracting the cylinder rods, thus moving the channel members 81,83 and the gate 63 towards the front of the apparatus.

The above described apparatus is used as follows: the apparatus is towed to the desired position and is made secure. The top doors 68,69 are pivoted to the fully open position using the hydraulic cylinders 72,73, and the end gates 63,64 are moved to their fully apart position i.e. with the rear end gate 64 adjacent the end of the apparatus and the front gate 63 adjacent the front of the apparatus.

A first load of material to be baled (e.g. scrap cardboard) is loaded into the compression chamber 60 through the open top doors 68,69 using a bucket loader. The top doors 68,69 are closed, and the material in the compression chamber is moved in the direction of arrow L (FIG. 9) by moving the forward gate 63 towards the rear of the apparatus.

The forward gate 63 is then returned to its initial position, the top doors 68,69 are opened again and a further load is loaded into the compression chamber 60 and is moved forward by the forward gate 63. The sequence is repeated until either a specified weight has been loaded into the compression chamber 60 and/or the hydraulic pressure required to move the forward gate 63 reaches a specified value. When this stage is reached, both forward and rear gates 63,64 are moved towards each other for a final compression of the load. In the final compression stage, the forward gate 63 is moved in the direction of arrow L until the gate reaches the position shown in FIG. 9, adjacent the forward edge of the bulkhead 78, just behind the rear top door 69; this reduces the level of pressure applied to the top doors. The rear gate 64 is then moved in the direction of arrow R until the hydraulic pressure in the hydraulic cylinders moving the front and rear gates is equal. A final compression is then applied by both forward and rear gates simultaneously.

The final compression takes place in the chamber 60a which is reinforced by the bulkhead 78 and is clear of the top doors. Localising in the final compression in this way means that it is necessary to reinforce only a relatively small area of the apparatus.

The formed bale is then tied off using any suitable automatic tying system. The tied bale is extracted from the chamber 60a by opening a hatch in the floor of the chamber 60a, withdrawing the rear gate 64 and then allowing the bale to fall out under gravity or, if necessary, pushing the bale away from the forward gate 63 by using an extraction hydraulic cylinder 98 which moves a pusher plate 99 (shown in FIG. 9 only, in the extended position) outwards from the inner wall of the gate 63, to push the bale away from the gate 63 and allow the bale to fall.

The apparatus is then returned to the start position, and the sequence repeated. It will be appreciated that the apparatus may be scaled up or scaled down as required. The hydraulic cylinders 74–77 could be replaced by pneumatic cylinders or by linear electric motors (depending upon the required pressure).

Further, the hydraulic cylinders or alternative moving means could be connected directly to the gates 63,64, i.e. the cylinder rods could be connected directly to the respective gates rather than being connected to the gates via the channel members. However, this arrangement has the drawback that when the gates are moved to the fully apart position, the cylinder rods are extended; since the apparatus normally would be in this position during transport, there would be a greater risk of damage to the cylinder rods.

The invention claimed is:

1. A baling apparatus comprising a compression chamber having a fixed height and width but a variable length, said length being defined by first and second opposed gates which are located one at each end of the compression chamber, each said gate being movable towards or away from the other gate by a pair of moving means, one moving means of each pair of said two pairs of moving means being mounted alongside the length of the compression chamber on one side of the chamber, and the other moving means of each pair of said two pairs of moving means being mounted alongside the length of the compression chamber on the opposite side of the compression chamber; the pair of moving means associated with the first gate lying in a first horizontal plane and the pair of moving means associated with the second gate lying in a second horizontal plane; said first horizontal plane being vertically above said second horizontal plane.

2. The baling apparatus as claimed in claim 1, wherein the compression chamber includes a reinforced portion, having walls which are reinforced to take a higher pressure than a part of the chamber not included in said reinforced portion; said moving means being mounted upon the outside of said reinforced portion.

3. The baling apparatus as claimed in claim 2, wherein each moving means includes a first member capable of linear displacement relative to a second member when said moving means is activated; the second member of each moving means being secured to said reinforced portion of the compression chamber; the first member of each moving means being connected to one of said gates, such that activation of one pair of moving means connected to one of said gates causes linear movement of said one gate towards or away from said reinforced portion, and activation of the other pair of moving means connected to the other of said gates causes linear movement of said other gate towards or away from said reinforced portion.

4. The baling apparatus as claimed in claim 3, wherein the first member of each moving means is connected to the corresponding gate by a connecting member secured between said gates and said first member; and wherein each moving means is oriented relative to the corresponding gate such that linear displacement of said first member of said moving means away from said second member moves the corresponding gate towards said reinforced portion.

5. The baling apparatus as claimed in claim 2, wherein said compression chamber includes a first portion adjacent said reinforced portion, said first portion being adapted to receive material to be compressed.

6. The baling apparatus as claimed in claim 5, wherein said first portion has a top which can be opened and closed.

7. The baling apparatus as claimed in claim 6, wherein at least part of a bottom of said compression chamber can be opened or closed, to permit a bale to be removed therefrom.

8. The baling apparatus as claimed in claim 1, wherein the apparatus is mobile.

9. The baling apparatus as claimed in claim 8, wherein the apparatus is mounted upon a trailer.

10. The baling apparatus as claimed in claim 1, wherein each said gate is movable by said corresponding pair of moving means independently of the other gate or simultaneously with the other gate.

11. The baling apparatus as claimed in claim 3 or claim 4, wherein said moving means are selected from the group consisting of: hydraulic cylinder, pneumatic cylinder, linear electric motor.

12. The baling apparatus as claimed in claim 5, further including a conveyor arranged to convey material to be compressed to said first portion.

* * * * *